(12) United States Patent  (10) Patent No.: US 11,953,967 B2
Searles et al.  (45) Date of Patent: Apr. 9, 2024

(54) POWER MANAGEMENT UNIT

(71) Applicant: Apple Inc., Cupertino, CA (US)

(72) Inventors: Shawn Searles, Austin, TX (US);
Preethi Damodaran, Germering (DE);
Ofir Gilad, Germering (DE); Michele De Fazio, Germering (DE); Inder M. Sodhi, Palo Alto, CA (US); Enrico Zanetti, Cascina (IT); Olivier Girard, Munich (DE); Lothar Münch, Germering (DE); Andrea Barsanti, Lido di Camaiore (IT); Andrea Lazzeri, Lido di Camaiore (IT)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/307,508

(22) Filed: Apr. 26, 2023

(65) Prior Publication Data
US 2023/0333625 A1 Oct. 19, 2023

Related U.S. Application Data

(63) Continuation of application No. 17/476,186, filed on Sep. 15, 2021, now Pat. No. 11,669,145.

(51) Int. Cl.
*G06F 1/32* (2019.01)
*G06F 1/324* (2019.01)
*G06F 1/3296* (2019.01)
*G06F 1/3234* (2019.01)

(52) U.S. Cl.
CPC ............ *G06F 1/324* (2013.01); *G06F 1/3296* (2013.01); *G06F 1/3275* (2013.01)

(58) Field of Classification Search
CPC ....... G06F 1/324; G06F 1/3296; G06F 1/3275
See application file for complete search history.

(56) References Cited

U.S. PATENT DOCUMENTS

| | | | |
|---|---|---|---|
| 2009/0249092 A1* | 10/2009 | Lam ........................ | G06F 1/266 713/300 |
| 2014/0317330 A1* | 10/2014 | Iyer ..................... | G06F 13/4295 710/305 |
| 2017/0153680 A1* | 6/2017 | Girard ..................... | G06F 1/266 |
| 2019/0250697 A1* | 8/2019 | Mocanu ................ | G06F 3/0604 |

* cited by examiner

*Primary Examiner* — Stefan Stoynov
(74) *Attorney, Agent, or Firm* — Kowert, Hood, Munyon, Rankin & Goetzel, P.C.; Dean M. Munyon

(57) ABSTRACT

A power management subsystem included in a computer system may include a host device and a power circuit group. The power circuit group includes multiple power circuits arranged in a tree-like structure. The resources of the multiple power circuits are mapped to corresponding addresses within a common address space. The host device sends, via a first communication bus, commands to a branch power circuit of the multiple power circuits, which, in turn, relays the commands, using a second communication bus, to corresponding ones of the other power circuits based on respective power resources specified in the commands received from the host device.

20 Claims, 13 Drawing Sheets

POWER MANAGEMENT UNIT

PRIORITY CLAIM

The present application is a continuation of U.S. application Ser. No. 17/476,186, entitled "Power Management Unit," filed Sep. 15, 2021, the disclosure of which is incorporated by reference herein in its entirety.

BACKGROUND

Technical Field

This disclosure relates to power management in computer systems, and more particularly to the management of power resources distributed across multiple power circuits.

Description of the Related Art

Modern computer systems may include multiple circuit blocks designed to perform various functions. For example, such circuit blocks may include processors or processor cores configured to execute software or program instructions. Additionally, the circuit blocks may include memory circuits, mixed-signal or analog circuits, and the like.

In some computer systems, the circuit blocks may be designed to operate using different power supply voltage levels. For example, in some computer systems, power circuits (also referred to as "power management units" or "power management integrated circuits") may generate and monitor various power supply signals. Such power circuits may be located on a common integrated circuit with a processor circuit, memory circuit, and the like. Alternatively, power circuits may be located on different integrated circuits from the processor circuit, memory circuit, etc.

Power circuits often include one or more power converter circuits configured to generate regulator voltage levels on respective power supply signal lines using a voltage level of an input power supply signal. Such converter circuits may employ multiple reactive circuit elements, such as inductors, capacitors, and the like.

SUMMARY OF THE EMBODIMENTS

Various embodiments for a power management subsystem are disclosed. Broadly speaking, a host device is coupled to a power circuit group that includes a plurality of power circuits that include branch power circuits and leaf power circuits arranged in a hierarchical fashion. The physical resources of the power circuits are mapping to corresponding addresses in a common address space. The host device is configured to send, via a first communication bus, a command that specifies a power resource using an address within the common address space to a branch power circuit included in the plurality of power circuits. The branch power circuit is configured, based on the address, to relay, via a second communication bus, the command to a leaf power circuit of the plurality of power circuits that is configured to execute the command.

DETAILED DESCRIPTION OF EMBODIMENTS

Computer systems may include multiple circuit blocks configured to perform specific functions. Such circuit blocks operate together to form a "host device" that acts as a server offering information resources, services, and applications to users or other devices on a network. The circuit blocks included a host device may be fabricated on a common substrate and may employ different power supply voltage levels. Power circuits (also referred to as "power management units" or "PMUs") are used to generate the different power supply voltage levels. In some cases, the power circuits may be located on dedicated integrated circuits. In such cases, power circuits may be referred to as "power management integrated circuits" or "PMICs."

Power circuits may include multiple power converter or voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.). Different resources (referred to herein as "power resources") of the power circuits may be adjusted during operation to achieve desired voltage levels on power supply nodes during different operating regimes of the computer system. For example, power resources may include reference voltage level, regulation mode, clock frequency, etc., and may be adjusted to different values when the computer system transitions from an active mode to a sleep or reduced power mode.

When multiple power circuits across multiple integrated circuits are employed in a computer system, the host device needs to communicate with each of the power circuits to make adjustments during operation. As the number of power circuits increases, additional interfaces must be added to the host device to allow communication with each power circuit, increasing chip area and power consumption. Additionally, the host device may need to divert more of its compute resources in order to maintain the communication across the multiple interfaces, thereby reducing the compute efficiency of the host device.

Techniques described in the present disclosure allow for a single communication interface for a host device to control multiple power circuits arranged in a tree-like structure referred to as a power circuit group. The power resources for the multiple power circuits in the power circuit group are included in a common address space. A command sent by the host device specifies a particular power resource and is relayed down through the tree structure to a particular power circuit that includes the particular power resource. By organizing the multiple power circuits in a power circuit group with a common address space, the complexity of the communication with multiple power circuits is reduced, reducing chip area, power dissipation, and improving the compute efficiency of the host device.

Figure 1:
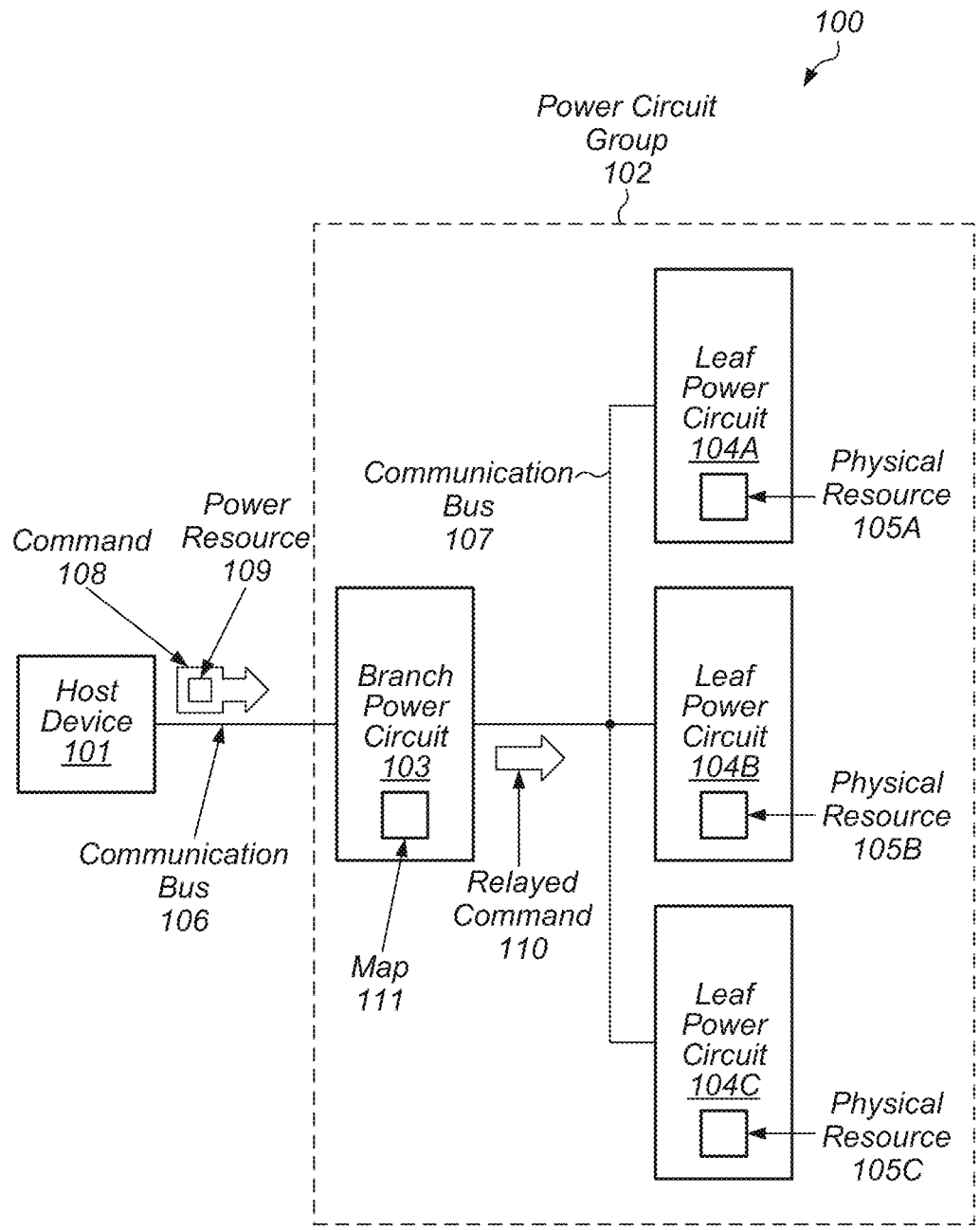
FIG. 1 is a block diagram of an embodiment of a computer system power management subsystem.

A block diagram depicting an embodiment of a computer system power management subsystem is depicted in FIG. 1. As illustrated, power management subsystem 100 includes host device 101 and power circuit group 102, which includes branch power circuit 103, and leaf power circuits 104A-C, coupled together via communication bus 107. In various embodiments, leaf power circuits 104A-C include corresponding physical resources 105A-C.

The power circuits within power circuit group 102 are organized in a hierarchical tree-like fashion, with branch power circuit 103 creating branches to leaf power circuits 104A-C, and the physical resources of the power circuits included in power circuit group 102 are mapped into a common address space. As used herein, a branch power circuit refers to a power circuit that includes two or more interfaces that allow for received commands to be routed to different branches, while a leaf power circuit refers to a power circuit that includes a single interface and is incapable of relaying commands to other power circuits. As described below, different numbers and arrangements of power circuits within power circuit group 102 are possible and contemplated.

Host device 101 is configured to send command 108 to branch power circuit 103 via communication bus 106. In various embodiments, command 108 includes power resource 109, and specifies one or more operations that power resource 109 is to perform in response to receiving command 108. Communication bus 106 may, in various embodiments, be any suitable type of serial or parallel communication bus, that employs a suitable communication protocol such as system power management interface (SPMI).

Branch power circuit 103 is configured, based on an address associated with power resource 109, to send relayed command 110 to leaf power circuit 104A via communication bus 107. To send relayed command 110, branch power circuit 103 may be further configured to map, using map 111, power resource 109 to physical resource 105A included in leaf power circuit 104A. As described below, branch power circuit 103 may be configured to re-format command 108 in order to generate relayed command 110. Such re-formatting may include changing a communication protocol used to encode command 108, changing a preamble or other addressing information included in command 108, or any other change to make command 108 compatible with communication bus 107. In some embodiments, leaf power circuit 104A may be configured, in response to receiving relayed command 110, to perform one or more operations specified in relayed command 110.

Like communication bus 106, communication bus 107 may employ one of different possible communication protocols such as SPMI, or general-purpose input/output (GPIO). It is noted that although a single communication bus is shown coupling branch power circuit 103 to leaf power circuits 104A-C, in other embodiments, multiple communication busses, using different communication protocols, may be employed.

Figure 2:
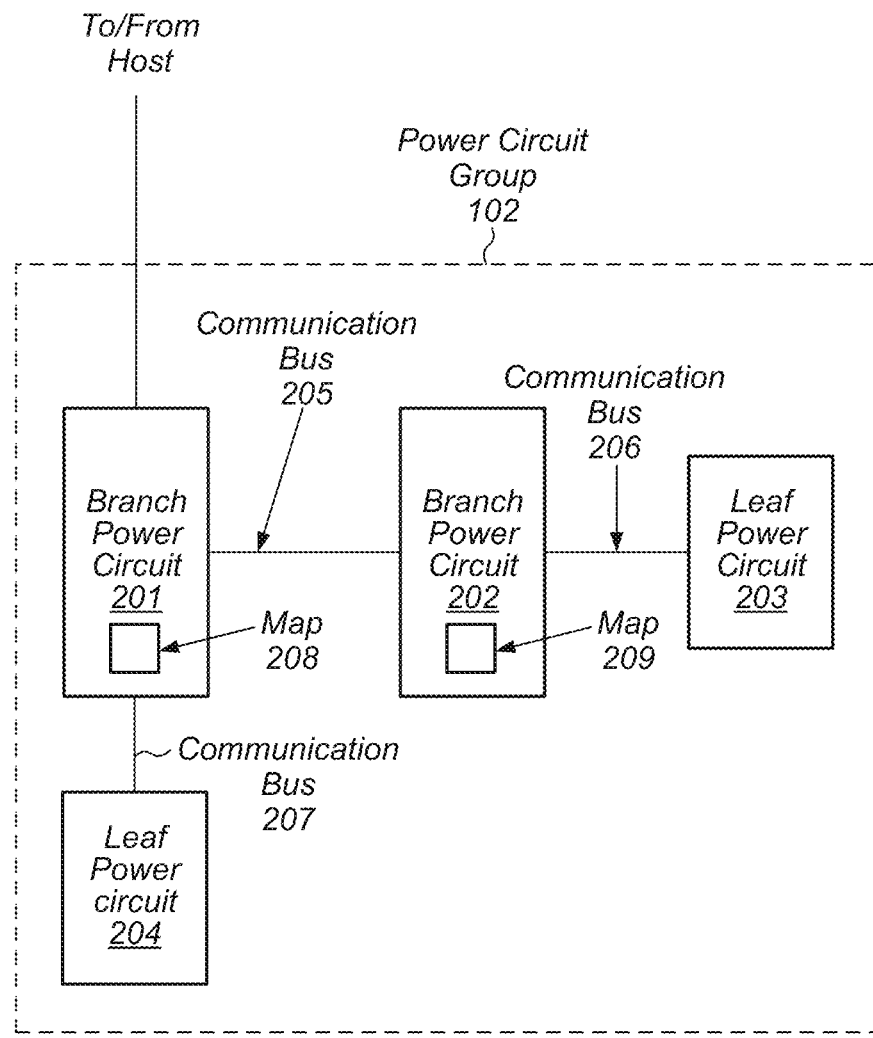
FIG. 2 illustrates a block diagram of an embodiment of a power circuit group.

Turning to FIG. 2, a block diagram of an embodiment of power circuit group 102 is depicted. As illustrated, power circuit group 102 includes branch power circuit 201, branch power circuit 202, leaf power circuit 203, and leaf power circuit 204. It is noted that although only four power circuits are depicted as being included in power circuit group 102, in other embodiments, any suitable number and combination of branch power circuits and leaf power circuits may be employed.

Branch power circuit 201 is coupled to branch power circuit 202 via communication bus 205, and is further coupled to leaf power circuit 204 via communication bus 207. In various embodiments, branch power circuit 201 is configured to receive command 108 from a host device, such as host device 101 as depicted in FIG. 1. Branch power circuit 201 is further configured to map power resource 109 using map 208. In various embodiments, map 208 maps addresses associated with power circuit group 102 to physical resources within branch power circuits 201 and 202 and leaf power circuits 203 and 204. In response to a determination that power resource 109 maps to a physical resource associated with either branch power circuit 202 or leaf power circuit 203, branch power circuit 201 is further configured to relay command 108 to branch power circuit 202 via communication bus 205. Branch power circuit 201 may, in some embodiments, be configured to translate command 108 from an initial communication protocol to a different communication protocol associated with communication bus 205. In various embodiments, communication bus 205 may employ a serial or parallel communication protocol such as a communication protocol associated with a system power management interface.

Alternatively, in response to a determination that power resource 109 maps to a physical resource associated with leaf power circuit 204, branch power circuit 201 is further configured to relay command 108 to leaf power circuit 204 via communication bus 207. Leaf power circuit 204 is configured, in response to receiving the relayed version of command 108, to perform one or more operations specified in the relayed version of command 108. In various embodiments, branch power circuit 201 may be further configured to translate command 108 from an initial communication protocol to a different communication protocol associated with communication bus 207. In some embodiments, communication bus 207 may employ a communication protocol associated with a general-purpose input/output (GPIO) interface.

Branch power circuit 202 is configured to receive a relayed command from branch power circuit 201. Using map 209, branch power circuit 202 is configured to determine a physical resource that corresponds to power resource 109. In various embodiments, branch power circuit 202 is configured to execute the relayed command, in response to a determination that power resource 109 corresponds to a physical resource included in branch power circuit 202.

Alternatively, in response to a determination that power resource 109 corresponds to a physical resource of leaf power circuit 203, branch power circuit 202 is configured to forward the relayed command to leaf power circuit 203, which is, in turn, configured to perform one or more operations specified in the relayed command. In various embodiments, communication bus 206 may employ the same communication protocol as communication bus 205. In other embodiments, communication bus 206 may employ a different communication protocol than communication bus 206.

Figure 3:
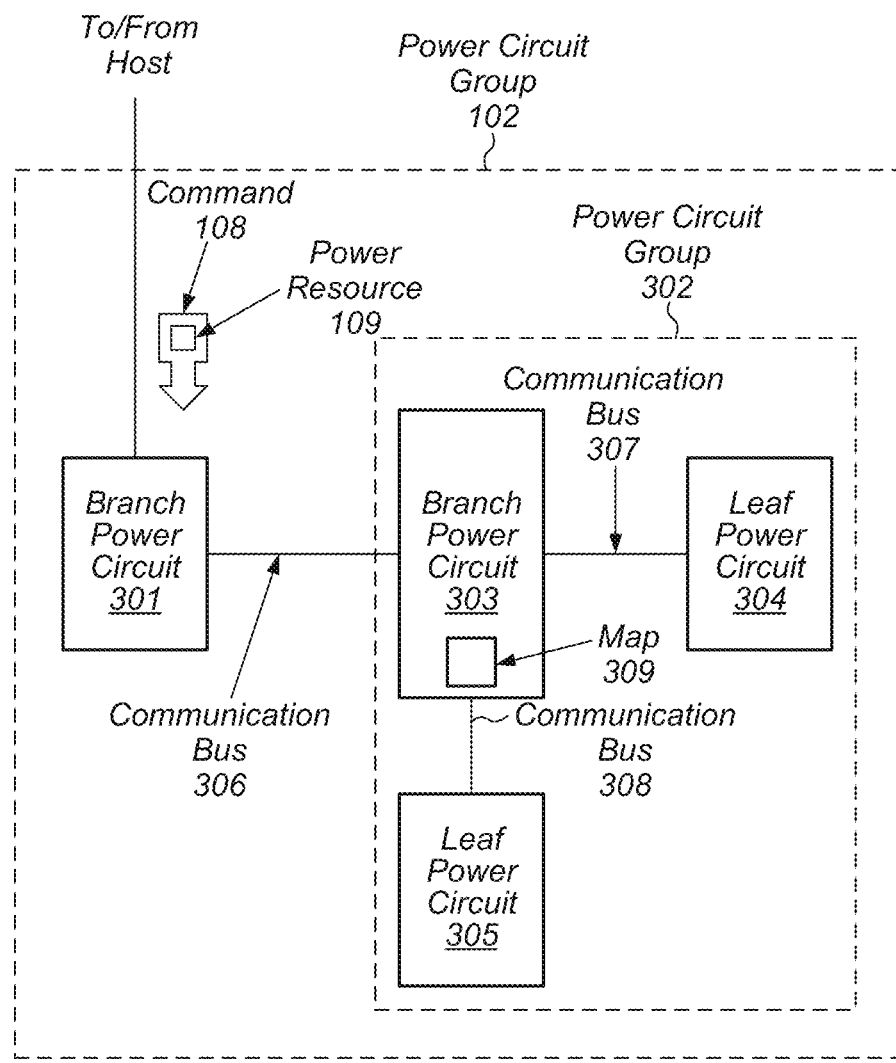
FIG. 3 illustrates a block diagram of a different embodiment of a power circuit group.

In some cases, power groups can be nested within each other, allowing for additional flexibility in managing the operation of power circuits within a computer system. A block diagram of a different embodiment of power circuit group 102 that includes a subgroup of power circuits is depicted in FIG. 3. As illustrated, power circuit group 102 includes branch power circuit 301 and power circuit group 302, which includes branch power circuit 303, and leaf power circuits 304 and 305.

Branch power circuit 301 is coupled to branch power circuit 303 via communication bus 306. It is noted that although branch power circuit 301 is depicted as only being coupled to power circuit group 302, in other embodiments, branch power circuit 301 may be coupled, via communication bus 306, to one or more leaf power circuits in addition to power circuit group 302. In various embodiments, communication bus 306 may employ one of various communication protocols, such as a communication protocol associated with a system power management interface (SMPI).

Physical resources of power circuits included in power circuit group 302 are mapped to a common address space that is a subspace of the address space of power circuit group 102. As used and defined herein, a subspace of an address space is a portion of the address space that includes addresses that are a proper subset of addresses included in the full address space. For example, a full address space may include addresses from 1-20, while a subspace of the address space may include addresses from 5-10. The addresses in the subspace need not be a set of contiguous addresses from the address space.

Branch power circuit 303 is configured to manage commands received from branch power circuit 301 that map to physical resources of leaf power circuits 304 and 305. As illustrated, branch power circuit 303 is coupled to leaf power circuit 304 via communication bus 307, and leaf power circuit 305 via communication bus 308. In various embodiments, communication bus 307 and communication bus 308 may employ different communication protocols. For example, communication bus 307 may employ a communication protocol associated with a system power management interface (SPMI), while communication bus 308 may employ a communication protocol associated with a general-purpose input/output (GPIO) interface. By supporting different communication protocols, a power circuit group may employ legacy power circuits without having to re-design such legacy power circuits to support newer communication protocols.

In various embodiments, branch power circuit 301 is configured to receive command 108 and check power resource 109. Branch power circuit 301 is further configured, in response to a determination that power resource 109 maps to a physical resource of a power circuit included in power circuit group 302, to relay command 108 to branch power circuit 303.

As described above, branch power circuit 303 is configured to handle incoming commands for power circuits within power circuit group 302. Branch power circuit 303 is configured to perform a comparison of power resource 109 to entries in map 309, and relay command 108 to either of leaf power circuits 304 or 305 based on results on the comparison.

It is noted that although only one level of power circuit group nesting is depicted in the embodiment of FIG. 3, in other embodiments, further nesting of power circuit groups is possible. It is also noted that although only a single power circuit group is depicted as being included in power circuit group 102, in other embodiments, power circuit group 102 may include any suitable number of power circuit groups as well as power circuits.

In various embodiments, branch power circuit 301 and the power circuits included in power circuit group 302 may be located on a common integrated circuit. In other embodiments, the power circuits included in power circuit group 302 may be located on a different integrated circuit (or multiple integrated circuits) than the integrated circuit that includes branch power circuit 301.

Figure 4:
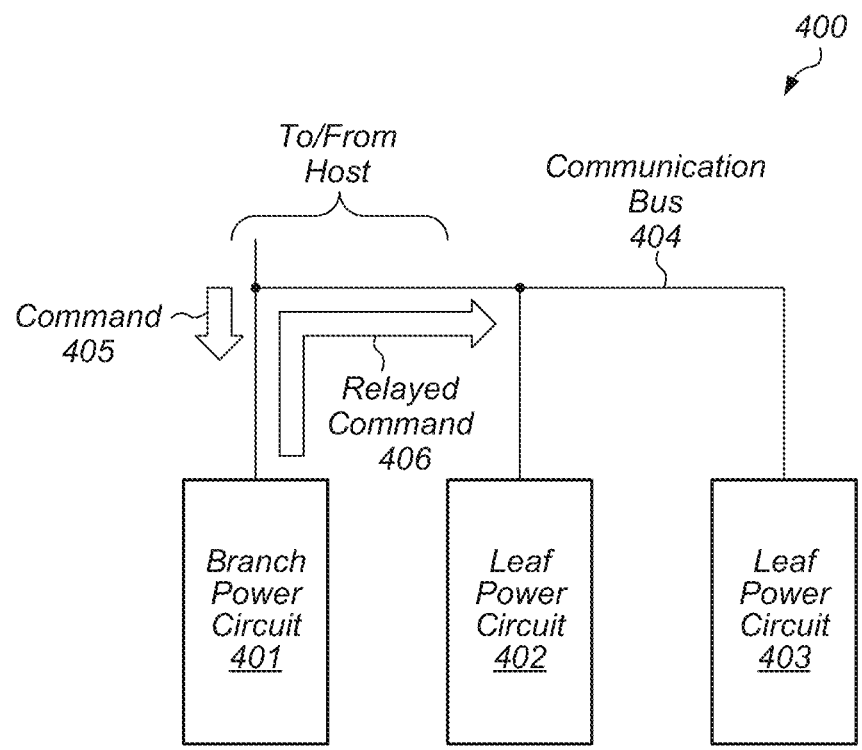
FIG. 4 illustrates a block diagram of another embodiment of a power circuit group.

Turning to FIG. 4, another embodiment of a power circuit group is depicted. As illustrated, power circuit group 400 includes branch power circuit 401, leaf power circuit 402, and leaf power circuit 403. In various embodiments, power circuit group 400 may correspond to power circuit group 102 as depicted in FIG. 1. It is noted that although only three power circuits are depicted as being included in power circuit group 400, in other embodiments, power circuit group 400 may include any suitable number of power circuits, as well as other power circuit groups.

Branch power circuit 401, leaf power circuit 402, and leaf power circuit 403 are coupled to communication bus 404. In various embodiments, communication bus 404 may correspond to communication bus 106 as depicted in FIG. 1. By coupling all of the power circuits in power circuit group 400 to a common bus, the wiring overhead associated with power circuit group 400 may be reduced. In various embodiments, communication bus 404 may employ one of various communication protocols, such as a communication protocol associated with a system power management interface (SPMI).

When a host device (e.g., host device 101) sends command 405 to power circuit group 400, branch power circuit 401 receives command 405. It is noted that leaf power circuits 402 and 403 lack the circuitry necessary to receive commands from the host device directly and, therefore, rely on branch power circuit 401 to receive and interpret commands from the host device.

Branch power circuit 401 is configured to receive command 405 via communication bus 404. In various embodiments, branch power circuit 401 is configured to map a power resource (e.g., power resource 109) included in command 405 to a physical resource included in one of the power circuits of power circuit group 400. In response to a determination that the power resource maps to one of its own physical resources, branch power circuit 401 is configured to perform one or more operations associated with command 405.

In response to a determination that the power resource maps to a physical resource of another power circuit in power circuit group 400, branch power circuit 401 is configured to generate and send relayed command 406 via communication bus 404. In various embodiments, branch power circuit 401 is configured to change the format of command 405 to generate relayed command 406. In some cases, the change in format may include changing a preamble or other header information associated with command 405 so that the relayed command 406 is received by the correct leaf power circuit.

Figure 5A:
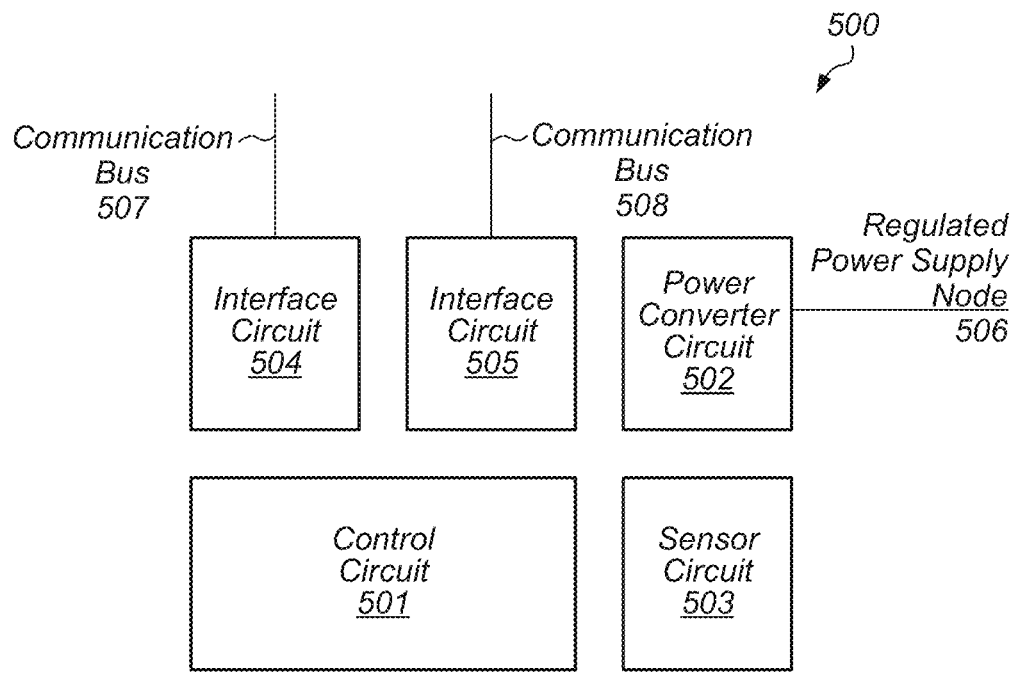
FIG. 5A illustrates a block diagram of a branch power circuit.

Turning to FIG. 5A, a block diagram of a branch power circuit is depicted. In various embodiments, branch power circuit 500 may correspond to any of the branch power circuits depicted in FIGS. 1-4, and 7-8. As illustrated, branch power circuit 500 includes control circuit 501, power converter circuit 502, sensor circuit 503, interface circuit 504, and interface circuit 505.

Power converter circuit 502 is configured to generate a particular voltage level on regulated power supply node 506. In various embodiments, regulated power supply node 506 may be coupled to a host device, such as host device 101 as depicted in FIG. 1. In some embodiments, power converter circuit 502 may be implemented using a buck converter circuit, a linear regulator circuit, or any other suitable type of voltage regulator circuit. It is noted that although a single power converter circuit is depicted in the embodiment of FIG. 5A, in other embodiments, multiple power converter circuits may be employed.

Sensor circuit 503 is configured to measure operating parameters of power converter circuit 502 to generate telemetry data. For example, sensor circuit 503 may be configured to measure a voltage level of regulated power supply node 506, a current delivered to a load circuit coupled to regulated power supply node 506 by power converter circuit 502, and the like. In various embodiments, sensor circuit 503 may be implemented using any suitable analog measurement circuits, and analog-to-digital converter (ADC) circuits to convert analog measurements into digital data.

Interface circuit 504 is coupled to communication bus 507 and is configured to send and receive data via communication bus 507. In some embodiments, the data may correspond to commands, responses to commands, telemetry, and the like. In various embodiments, interface circuit 504 may be implemented using level translation circuits, serializer/de-serializer circuits, and any other suitable circuits used in sending and receiving data via communication bus 507. In a similar fashion, interface circuit 505 is coupled to communication bus 508 and is configured to send and receive data via communication bus 508, and may be implemented using similar circuits as interface circuit 504.

Control circuit 501 is configured to control the operation of power converter circuit 502, sensor circuit 503, and interface circuits 504 and 505. In various embodiments, control circuit 501 may compare information in a command received via either of communication busses 507 or 508 to an address map (not shown). Based on results of such a comparison, control circuit 501 may relay the command to a different power circuit (either a branch power circuit or a leaf power circuit), or control circuit 501 may execute operations specified in the received command.

Control circuit 501 may additionally be configured to activate the gathering of telemetry by sensor circuit 503. In some cases, control circuit 501 may activate such gathering at periodic intervals, or in response to receiving a command via communication bus 507 or communication bus 508. In various embodiments, control circuit 501 may store telemetry from sensor circuit 503, or may relay the telemetry from sensor circuit 503 back to a host device, such as host device 101. Control circuit 501 may, in some embodiments, be implemented using any suitable combination of combinatorial and sequential logic circuits.

Figure 5B:
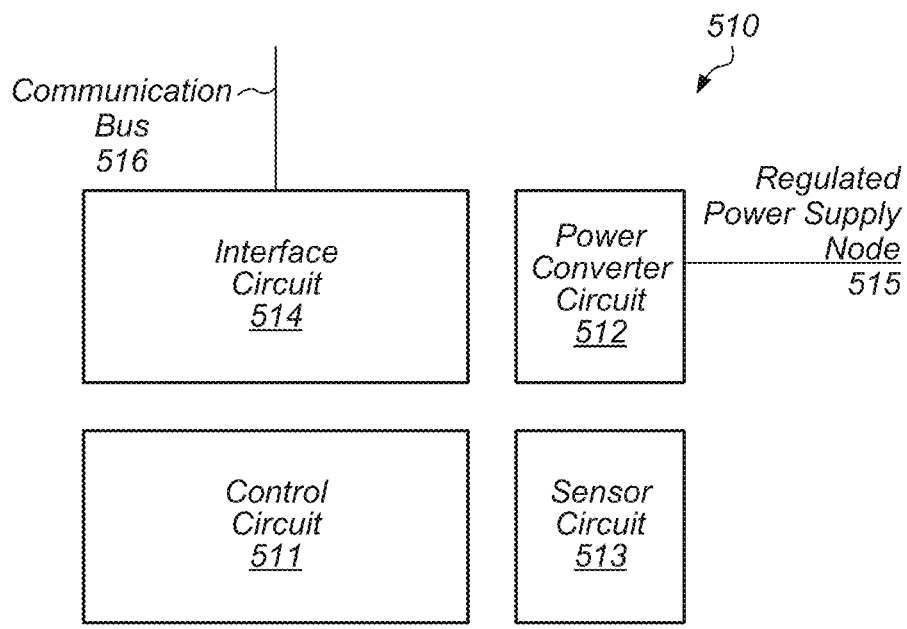
FIG. 5B illustrates a block diagram of a leaf power circuit.

As described above, a leaf power circuit includes a single interface circuit coupled to a communication bus, and is incapable of relaying received data to other power circuits. A block diagram of an embodiment of a leaf power circuit is depicted in FIG. 5B. In various embodiments, leaf power circuit 510 may correspond to any of the leaf power circuits depicted in FIGS. 1-4, and 7-8. As illustrated, leaf power circuit 510 includes control circuit 511, power converter circuit 512, sensor circuit 513, and interface circuit 514.

Power converter circuit 512 is configured to generate a particular voltage level on regulated power supply node 515. In various embodiments, regulated power supply node 515 may be coupled to a host device, such as host device 101 as depicted in FIG. 1. In some embodiments, power converter circuit 512 may be implemented using a buck converter circuit, a linear regulator circuit, or any other suitable type of voltage regulator circuit. It is noted that although a single power converter circuit is depicted in the embodiment of FIG. 5B, in other embodiments, multiple power converter circuits may be employed.

Sensor circuit 513 is configured to measure operating parameters of power converter circuit 512 to generate telemetry data. For example, sensor circuit 513 may be configured to measure a voltage level of regulated power supply node 515, a current delivered to a load circuit coupled to regulated power supply node 515 by power converter circuit 512, and the like. In various embodiments, sensor circuit 513 may be implemented using any suitable analog measurement circuits, and analog-to-digital converter (ADC) circuits to convert analog measurements into digital data.

Interface circuit 514 is coupled to communication bus 516, and is configured to send and receive data via communication bus 516. In some embodiments, the data may correspond to commands, responses to commands, telemetry, and the like. In various embodiments, interface circuit 514 may be implemented using level translation circuits, serializer/de-serializer circuits, and any other suitable circuits used in sending and receiving data via communication bus 516.

Control circuit 511 is configured to control the operation of power converter circuit 512, sensor circuit 513, and interface circuit 514. In various embodiments, control circuit 511 may compare information in a command received via communication bus 516 to an address map (not shown). Based on results of such a comparison, control circuit 511 may verify the received command is intended for leaf power circuit 510, and, once verified, execute operations specified in the received command.

Control circuit 511 may additionally be configured to activate the gathering of telemetry by sensor circuit 513. In some cases, control circuit 511 may activate such gathering at periodic intervals, or in response to receiving a command via communication bus 516. In various embodiments, control circuit 511 may store telemetry from sensor circuit 513, or may relay the telemetry from sensor circuit 513 back to a branch power circuit. Control circuit 511 may, in some embodiments, be implemented using any suitable combination of combinatorial and sequential logic circuits.

Figure 6:
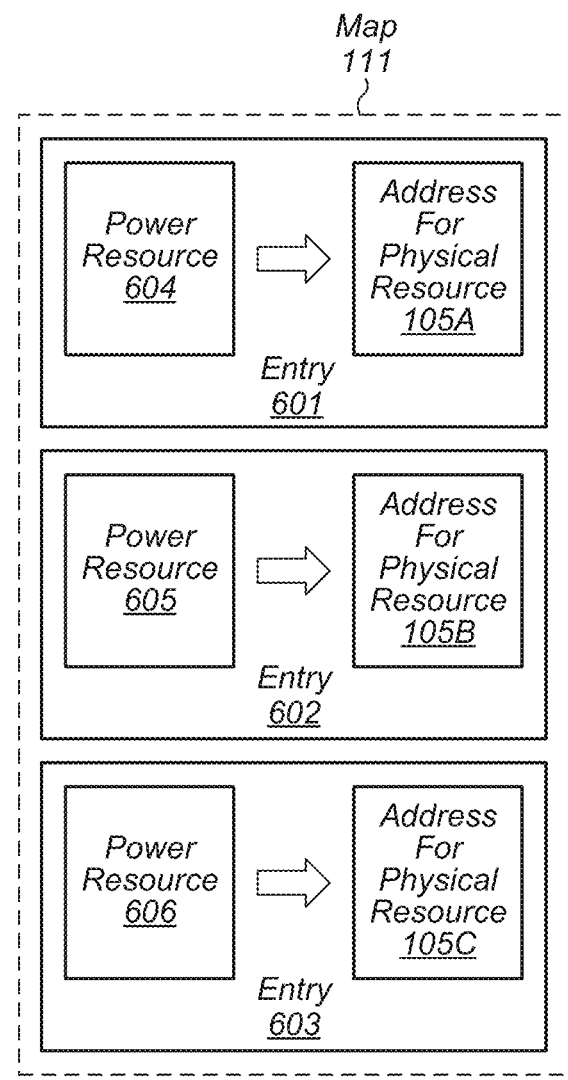
FIG. 6 illustrates a block diagram of a map of a power circuit group's resources to individual resources of power circuits included in the power circuit group.

Turning to FIG. 6, a block diagram of an embodiment of map 111 is depicted. In various embodiments, similar structures may be used for maps 208, 209, and 309. As illustrated, map 111 includes entries 601, 602, and 603. Although only three entries are depicted in the embodiment of FIG. 6, in other embodiments, any suitable number of entries may be employed. In some cases, the number of entries in map 111 may be based on a number of power circuits included in a computer system and a number of physical resources included in the included power circuits.

Entry 601 maps power resource 604 to an address for physical resource 105A. In a similar fashion, entry 602 maps power resource 605 to an address for physical resource 105B, and entry 603 maps power resource 606 to an address for physical resource 105C. In various embodiments, the addresses for physical resources 105A-C may correspond to addresses for leaf power circuits 104A-C as depicted in FIG. 1. The addresses for physical resources 105A-C may identify corresponding ones of leaf power circuits 104A-C on communication bus 107 or any other suitable communication bus. It is noted that that the addresses for physical resources 105A-C may include any suitable number of bits. In some cases, the number of bits included in the addresses for physical resources 105A-C may be based on a number of power circuits included within a power circuit group.

In cases where a power circuit includes multiple physical resources (e.g., a power circuit that includes two power converter circuits), addresses for physical resources 105A-C may not only specify corresponding power circuits, but contain additional information (e.g., extra bits) to specify particular physical resources within the power circuits.

In various embodiments, map 111 may be stored in a static random-access memory (SRAM) circuit, a register file circuit, or any other suitable storage circuit. Map 111 may be loaded into such a storage circuit during an initialization or boot procedure for a computer system. In some cases, map 111 may be updated "on the fly" to remove entries in response to a determination that a particular power circuit has been removed from the computer system, or is no longer functioning.

In addition to receiving commands from a host device, a power circuit group may gather and relay telemetry to the host device. As used and described herein, telemetry refers to data indicative of operating parameters of a power circuit. For example, telemetry may include data indicative of an operating temperature, a voltage level of an input power supply, a voltage level of an output regulated power supply node, a value of current being sourced to a load circuit, and the like. As described below, a power circuit included in a power circuit group may gather telemetry and relay it to a branch power circuit within the power circuit group.

Figure 7:
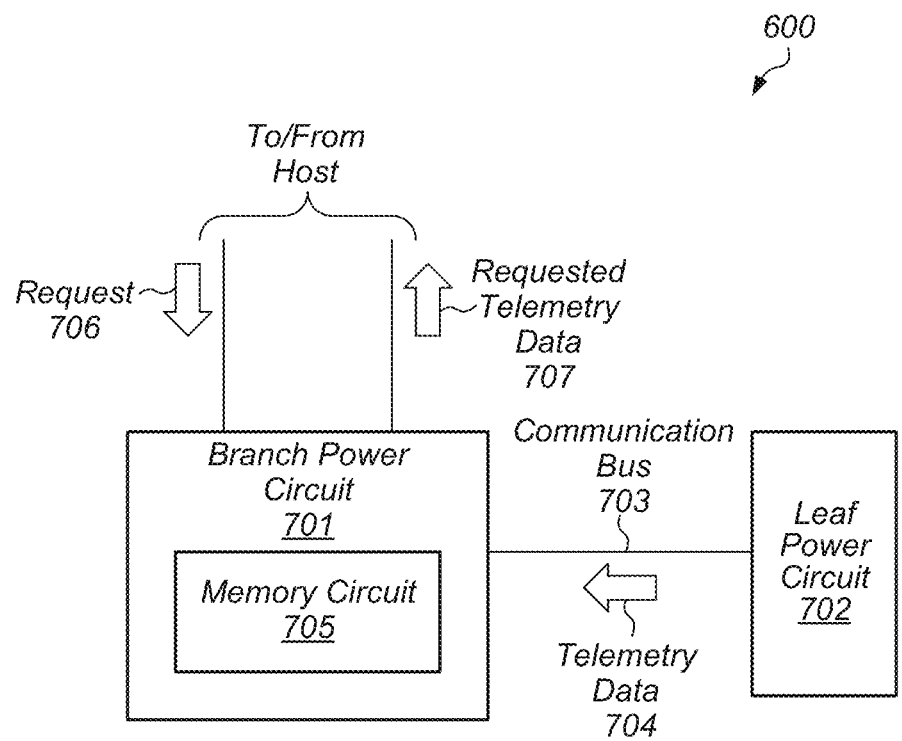
FIG. 7 is a block diagram depicting a relay of telemetry within power circuits included in a power circuit group.

Turning to FIG. 7, a block diagram of a power circuit group is depicted. As illustrated, power circuit group 700 includes branch power circuit 701 and leaf power circuit 702. Branch power circuit 701 includes memory circuit 705. In various embodiments, power circuit group 700 may correspond to power circuit group 102 as depicted in FIG. 1. It is noted that although only a single leaf power circuit is included in the embodiment of FIG. 7, in other embodiments, any suitable number of leaf power circuits may be employed. It is further noted that branch power circuit 701 and leaf power circuit 702 may be located on a common integrated circuit or on different integrated circuits.

Leaf power circuit 702 is configured to gather telemetry data 704. In various embodiments, telemetry data 704 may include information indicative of output voltage and currents levels generated by leaf power circuit 702. In some embodiments, leaf power circuit 702 may be configured to send telemetry data 704 to branch power circuit 701 via communication bus 703. Leaf power circuit 702 may be configured to encode, prior to transmission, telemetry data 704 according to a communication protocol associated with communication bus 703.

In some cases, leaf power circuit 702 may gather and send telemetry data 704 at periodic intervals. Such intervals may be programmable by a host device, such as host device 101. Alternatively, or additionally, leaf power circuit 702 may send telemetry data 704 to branch power circuit 701 in response to receiving a request from branch power circuit 701.

Branch power circuit 701 is configured to receive and store telemetry data 704 in memory circuit 705. In various embodiments, branch power circuit 701 may send a request for telemetry data to leaf power circuit 702 at particular times. Although branch power circuit 701 is depicted as storing telemetry data from a single leaf power circuit, in other embodiments, branch power circuit 701 may be configured to store telemetry data from multiple leaf power circuits. In such cases, the various telemetry data may be tagged with respective identifying information prior to storage in memory circuit 705.

In various embodiments, branch power circuit 701 is configured to receive request 706 from a host device, such as host device 101 as depicted in FIG. 1. Request 706 may include a request for telemetry data from a particular leaf power circuit (e.g., leaf power circuit 702) coupled to branch power circuit 701. Alternatively, request 706 may not specify a particular leaf power circuit, but rather be a request for telemetry data currently stored in memory circuit 705. Branch power circuit 701 is also configured, in response to receiving request 706, to send requested telemetry data 707 to the host device. In various embodiments, branch power circuit 701 may be configured to format or encode requested telemetry data 707 according to a communication protocol employed by the host device.

Memory circuit 705 may be implemented as a static random-access memory (SRAM) circuit, a register file circuit, or any other suitable storage circuit. The amount of storage included in memory circuit 705 may be based on a number of leaf power circuits coupled to branch power circuit 701, an amount of information encoded in telemetry data 704, a frequency with which telemetry data 704 is generated, or any suitable combination thereof.

Figure 8:
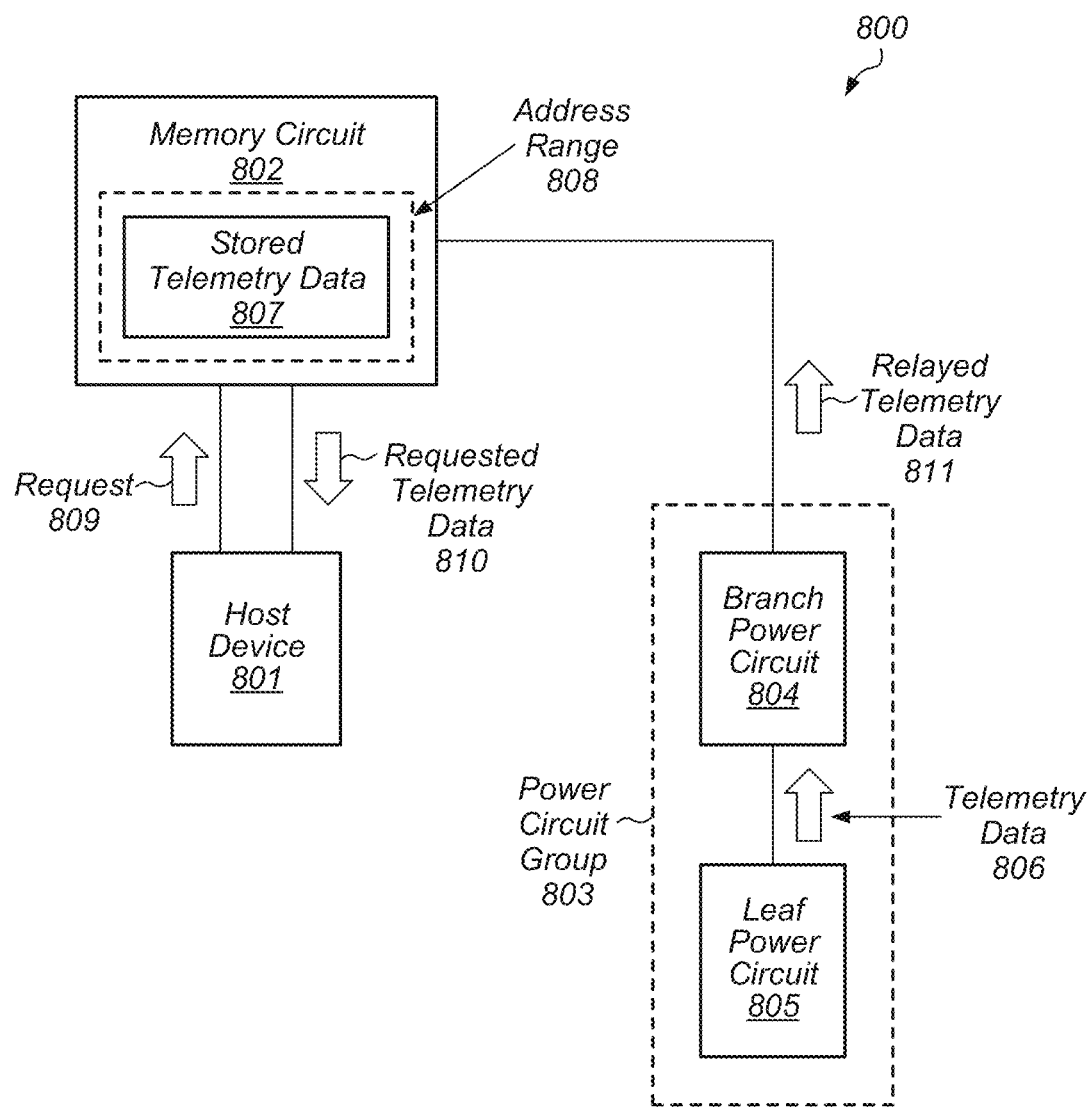
FIG. 8 is a block diagram depicting the storage of power circuit telemetry in a memory circuit of a computer system.

Telemetry data from power circuits may be collected for use by a host device in other ways. A block diagram of a computer system configured to store power circuit telemetry data is depicted in FIG. 8. As illustrated, computer system 800 includes host device 801, memory circuit 802, and power circuit group 803, which includes branch power circuit 804 and leaf power circuit 805. It is noted that host device 801, memory circuit 802, and power circuit group 803 may be located on respective integrated circuits. In some cases, branch power circuit 804 and leaf power circuit 805 may be located on respective integrated circuits different from the integrated circuits where host device 801 and memory circuit 802 are located.

In various embodiments, power circuit group 803 may correspond to power circuit group 102 as depicted in FIG. 1. It is noted that although only two power circuits are depicted in power circuit group 803, in other embodiments, power circuit group 803 may include any suitable number of power circuits and/or other power circuit groups.

Leaf power circuit 805 is configured to gather and send telemetry data 806 to branch power circuit 804. In various embodiments, leaf power circuit 805 may gather and send telemetry data 806 at periodic intervals, or in response to requests from branch power circuit 804. Leaf power circuit 805 may, in some embodiments, include one or more power converter and/or voltage regulator circuits.

Branch power circuit 804 is configured to send relayed telemetry data 811 to memory circuit 802. In various embodiments, relayed telemetry data 811 may include telemetry data 806 from leaf power circuit 805, or it may include telemetry data gathered by branch power circuit 804. In some embodiments, branch power circuit 804 may send relayed telemetry data 811 to memory circuit 802 at periodic intervals, or in response to requests from host device 801.

Branch power circuit 804 may, in some embodiments, include one or more power converter circuits and/or voltage regulator circuits.

Memory circuit 802 is configured to receive and store relayed telemetry data 811 as stored telemetry data 807. In various embodiments, stored telemetry data 807 may be stored in address range 808, which may be allocated based on a number of power circuits included in power circuit group 803. Memory circuit 802 may be implemented as a SRAM circuit, dynamic random-access memory (DRAM) circuit, or any other suitable type of data storage circuit. In some embodiments, memory circuit 802 may be included in system memory for computer system 800.

Host device 801 may, in some embodiments, correspond to host device 101 as depicted in FIG. 1. In various embodiments, host device 801 is configured to send request 809 to memory circuit 802. Request 809 may specify all or part of address range 808 wherein stored telemetry data 807 is located. Host device 801 may send request 809 at periodic intervals, or in response to a detection of a particular event (e.g., activation or deactivation of a low-power or sleep mode, execution of a particular software program or application, etc.)

In some embodiments, host device 801 is also configured to receive requested telemetry data 810 from memory circuit 802. Host device 801 may be further configured to perform an analysis using requested telemetry data 810. For example, host device 801 may be configured to determine different software programs or applications that result in increased output load current by one or more of the power circuits included in power circuit group 803. Host device 801 may, in some embodiments, adjust, based on requested telemetry data 810, operating settings of the power circuits included in power circuit group 803 by sending commands as described above. In other embodiments, host device 801 may send requested telemetry data 810 to other computer systems or external test equipment for further analysis.

Figure 9:
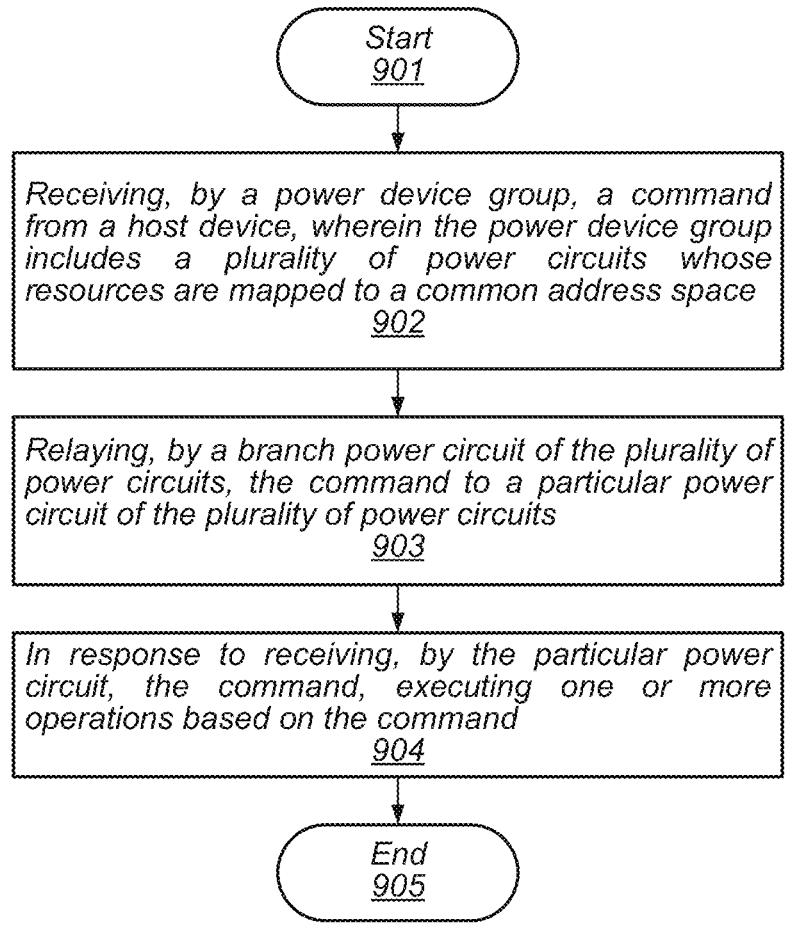
FIG. 9 illustrates a flow diagram depicting an embodiment of a method for a host device sending commands to a power circuit group.

Turning to FIG. 9, a flow diagram depicting an embodiment of a method for a host device sending commands to a power circuit group is illustrated. The method, which may be applied to power management subsystem 100, begins in block 901.

The method includes receiving, by a power device group, a command from a host device, wherein the power device group includes a plurality of power circuits whose resources are mapped to a common address space (block 902). In various embodiments, the method further includes receiving the command by the branch power circuit via a first communication bus. In some embodiments, the method may further include generating, by the particular power circuit, a particular voltage level on a regulated power supply node coupled to the host device.

The method further includes relaying, by a branch power circuit of the plurality of power circuits, the command to a particular power circuit of the plurality of power circuits (block 903). In various embodiments, relaying the command includes mapping, by the branch power circuit using an address map, a resource address included in the command to a particular address corresponding to a resource included in the particular power circuit.

In some cases, the method may further include retrieving, by the branch power circuit, the address map from a memory circuit as part of an initialization operation. In some cases, the method includes relaying, by the branch power circuit via a second communication bus, the command to the particular power circuit. In various embodiments, the method may also include translating, by the branch power circuit, the command from a first communication protocol to a second communication protocol.

The method also includes, in response to receiving, by the particular power circuit, the command, executing one or more operations based on the command (block 904). In various embodiments, the one or more operations may include increasing a desired voltage level for the regulated power supply node coupled to host device. The method concludes in block 905.

Figure 10:
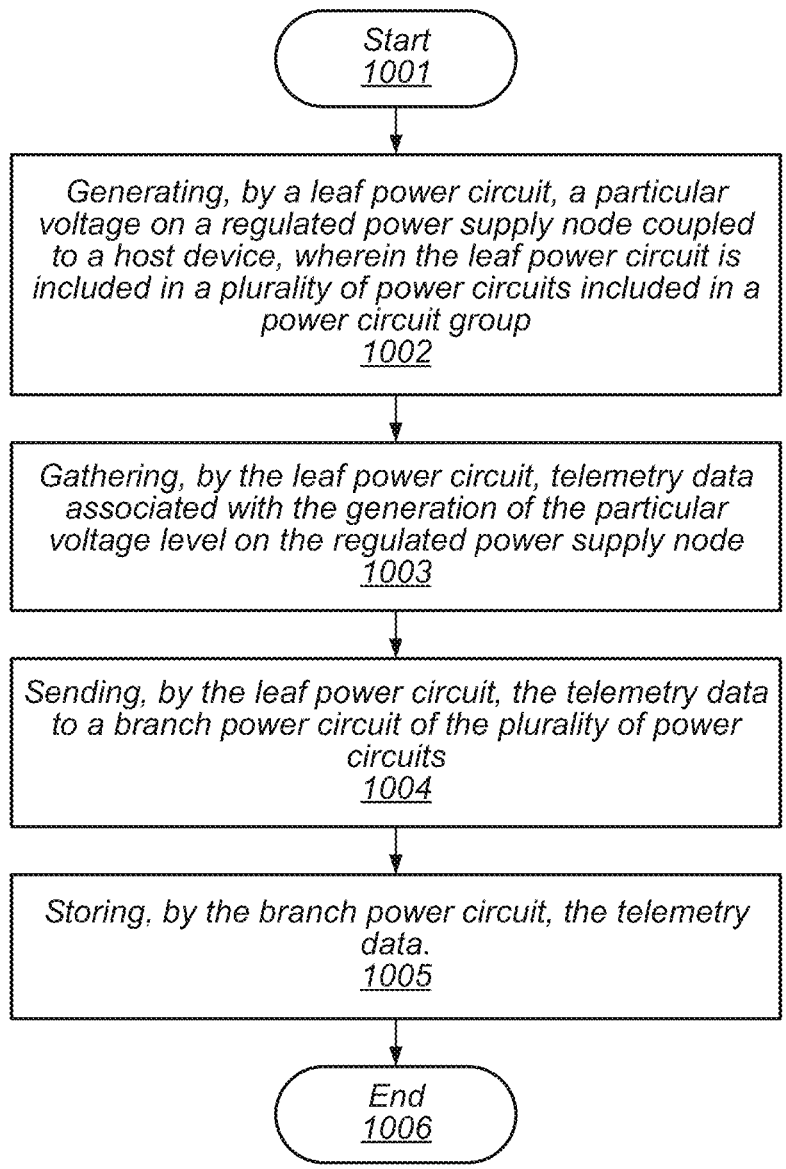
FIG. 10 illustrates a flow diagram depicting an embodiment of a method for gathering telemetry from a power circuit.

Turning to FIG. 10, a flow diagram depicting an embodiment of a method for gathering telemetry from a power circuit is illustrated. The method, which may be applied to various power circuit groups, such as power group 600 as depicted in FIG. 6, begins in block 1001.

The method includes generating, by a leaf power circuit, a particular voltage level on a regulated power supply node coupled to a host device, wherein the leaf power circuit is included in a plurality of power circuits included in a power circuit group (block 1002). In various embodiments, the method may include generating, by a power converter circuit included in the leaf power circuit, the particular voltage level on the regulated power supply node.

The method also includes gathering, by the leaf power circuit, telemetry data associated with the generation of the particular voltage level on the regulated power supply node (block 1003). In some embodiments, the method includes gathering the telemetry data, by the leaf power circuit, in response to receiving a command from a branch power circuit. The method may, in some embodiments, include gathering, by the leaf power circuit, a plurality of telemetry data sets at respective time periods of a plurality of time periods.

The method further includes sending, by the leaf power circuit, the telemetry data to a branch power circuit of the plurality of power circuits (block 1004). In various embodiments, the method may further include encoding, by the leaf power circuit, the telemetry data prior to sending the telemetry data to the branch power circuit.

The method also includes storing, by the branch power circuit, the telemetry data (block 1005). In various embodiments, the method also includes sending, by the host device, a request for the telemetry data to the branch power circuit, and sending, by the branch power circuit in response to receiving the request, the telemetry data to the host device.

The method may, in some embodiments, further include performing, by the host device, an analysis of the data, and sending, by the host device and based on a result of the analysis, a command to adjust a resource associated with the leaf power circuit. In various embodiments, the method may also include sending, by the branch power circuit, the telemetry data to a memory circuit coupled to the host device and the branch power circuit. The method may further include receiving, by the memory circuit, the telemetry data from the branch power circuit, and storing, by the memory circuit, the telemetry data in a storage location within a particular range of addresses. In some embodiments, the method also includes retrieving, by the host device, the telemetry data from the memory circuit. The method concludes in block 1006.

Figure 11:
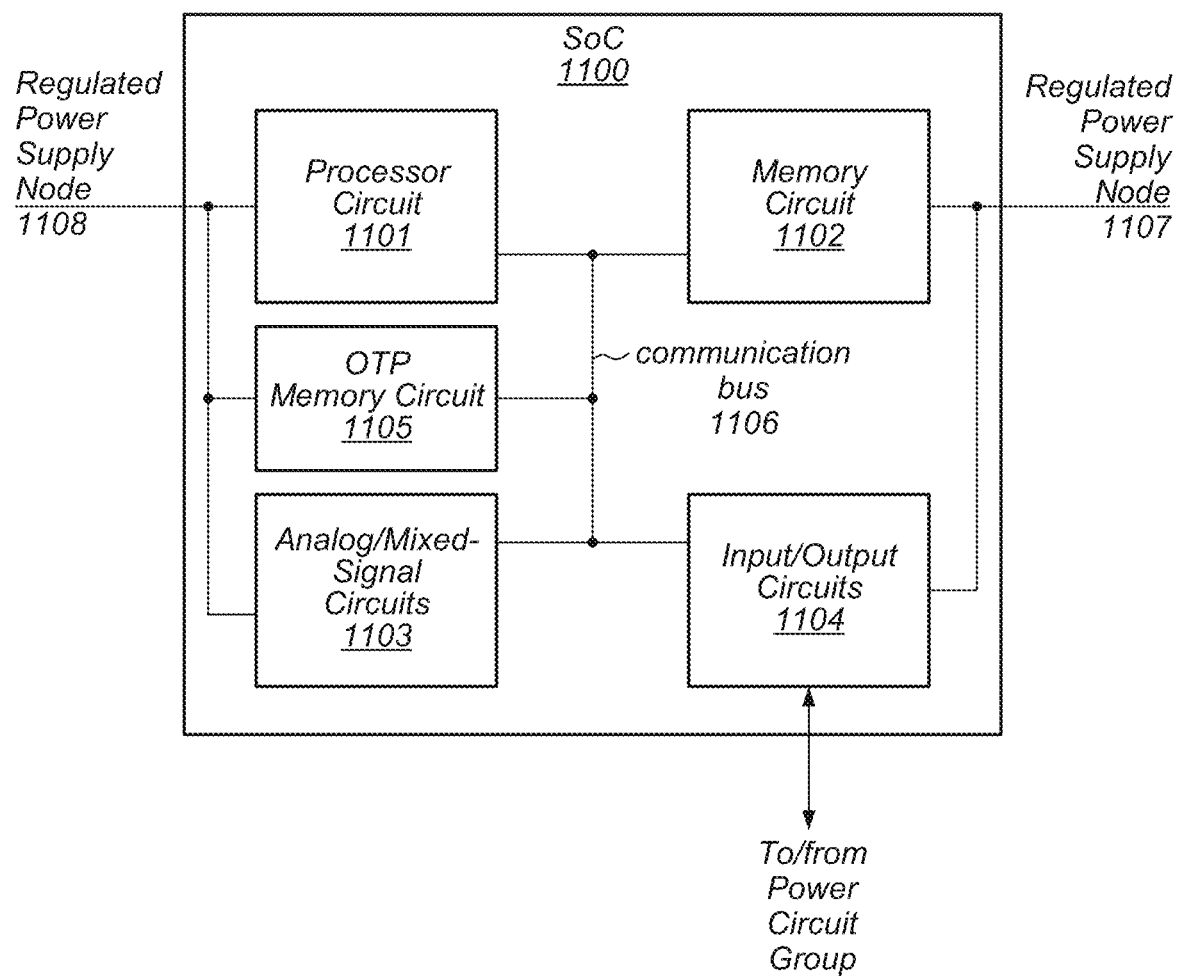
FIG. 11 is a block diagram of an embodiment of a system-on-a-chip.

A block diagram of a system-on-a-chip (denoted "SoC 1100") is illustrated in FIG. 11. In various embodiments, SoC 1100 may be configured for use in a desktop computer, server, or in a mobile computing application such as, e.g., a tablet, laptop computer, or wearable computing device. As illustrated, Soc 1100 includes processor circuit 1101, memory circuit 1102, analog/mixed-signal circuit 1103, input/output circuits 1104, and one-time programmable (OTP) memory circuit 1105, each of which is coupled to power supply node 1106. Memory circuit 1102 and input/output circuits 1104 are coupled to regulated power supply node 1107, while processor circuit 1101, OPT memory circuit 1105, and analog/mixed-signal circuits 1103 are coupled to regulated power supply node 1108. In various embodiments, the voltage levels on regulated power supply nodes 1107 and 1108 may be generated by power circuits included in power circuit group 102. It is noted that, in other embodiments, different ones of the circuit blocks may be coupled to different regulated power supply nodes.

Processor circuit 1101 may, in various embodiments, be representative of a general-purpose processor that performs computational operations. For example, processor circuit 1101 may be a central processing unit (CPU) such as a microprocessor, a microcontroller, an application-specific integrated circuit (ASIC), or a field-programmable gate array (FPGA).

Memory circuit 1102 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 11, in other embodiments, any suitable number of memory circuits may be employed.

Analog/mixed-signal circuits 1103 may include a crystal oscillator circuit, a phase-locked loop circuit, an analog-to-digital converter (ADC) circuit, and a digital-to-analog converter (DAC) circuit (all not shown). In some embodiments, analog/mixed-signal circuits 1103 may include one or more sensor circuits configured to measure operating parameters (e.g., temperature) of SoC 1100.

Input/output circuits 1104 may be configured to coordinate data transfer between SoC 1100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1104 may be configured to implement a version of Universal Serial Bus (USB) protocol or IEEE 1394 (Firewire®) protocol. In some embodiments, input/output circuits 1104 may be configured to send commands and receive telemetry from a power circuit group (e.g., power circuit group 102).

Input/output circuits 1104 may also be configured to coordinate data transfer between SoC 1100 and one or more devices (e.g., other computing systems or integrated circuits) coupled to SoC 1100 via a network. In one embodiment, input/output circuits 1104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1104 may be configured to implement multiple discrete network interface ports.

OTP memory circuit 1105 is configured to store data indicative of map 111 as depicted in FIG. 1. In various embodiments, the data indicative of map 111 may be programmed into OTP memory circuit 1105 during wafer probe or other suitable test/assembly operations. OTP memory circuit 1105 may be implemented using non-volatile data storage cells, fuses, or any other suitable one-time programmable storage structure.

Figure 12:
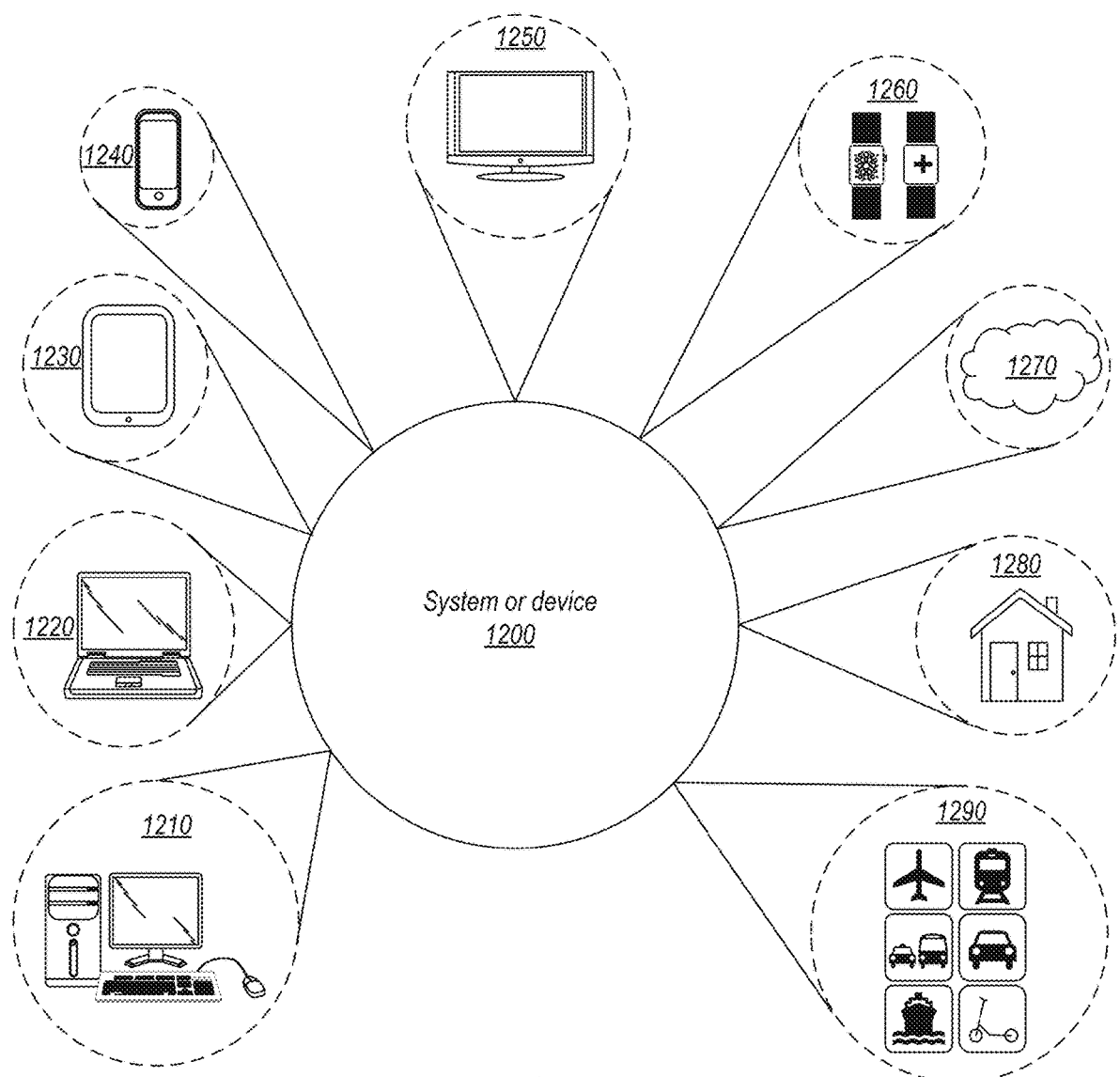
FIG. 12 is a block diagram of various embodiments of computer systems that may include power supply circuits.

Turning now to FIG. 12, various types of systems that may include any of the circuits, devices, or systems discussed above are illustrated. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Figure 13:
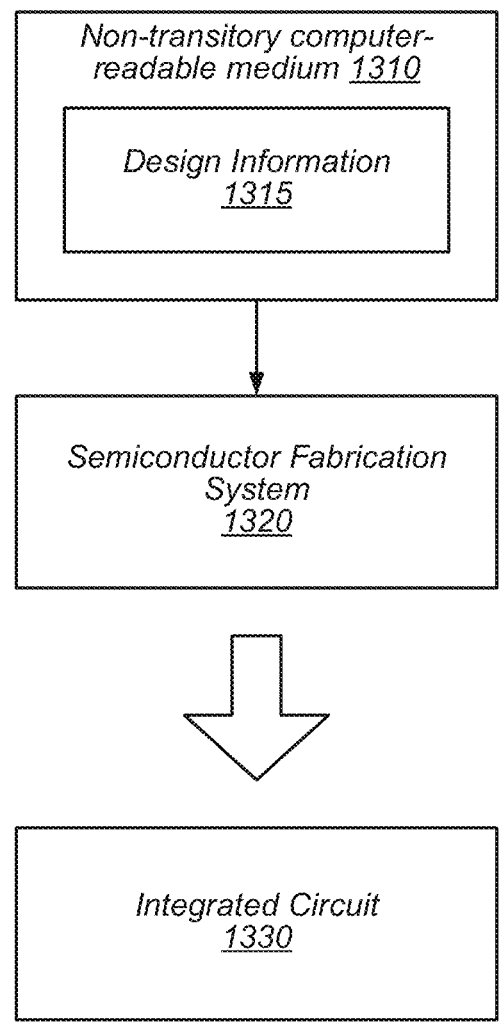
FIG. 13 illustrates an example of a non-transitory computer-readable storage medium that stores circuit design information.

FIG. 13 is a block diagram illustrating an example of a non-transitory computer-readable storage medium that stores circuit design information, according to some embodiments. In the illustrated embodiment, semiconductor fabrication system 1320 is configured to process the design information 1315 stored on non-transitory computer-readable storage medium 1310 and fabricate integrated circuit 1330 based on the design information 1315.

Non-transitory computer-readable storage medium 1310 may comprise any of various appropriate types of memory devices or storage devices. Non-transitory computer-readable storage medium 1310 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Non-transitory computer-readable storage medium 1310 may include two or more memory mediums, which may reside in different locations, e.g., in different computer systems that are connected over a network.

Design information 1315 may be specified using any of various appropriate computer languages, including hardware description languages such as, without limitation: VHDL, Verilog, SystemC, SystemVerilog, RHDL, M, MyHDL, etc. Design information 1315 may be usable by semiconductor fabrication system 1320 to fabricate at least a portion of integrated circuit 1330. The format of design information 1315 may be recognized by at least one semiconductor fabrication system, such as semiconductor fabrication system 1320, for example. In some embodiments, design information 1315 may include a netlist that specifies elements of a cell library, as well as their connectivity. One or more cell libraries used during logic synthesis of circuits included in integrated circuit 1330 may also be included in design information 1315. Such cell libraries may include information indicative of device or transistor level netlists, mask design data, characterization data, and the like, of cells included in the cell library.

Integrated circuit 1330 may, in various embodiments, include one or more custom macrocells, such as memories, analog or mixed-signal circuits, and the like. In such cases, design information 1315 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 is configured to operate according to a circuit design specified by design information 1315, which may include performing any of the functionality described herein. For example, integrated circuit 1330 may include any of various elements shown or described herein. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus comprising:
   a power circuit group having a plurality of power circuits, the plurality of power circuits being hierarchically arranged and including a branch power circuit and a leaf power circuit, wherein the leaf power circuit includes:
      a power converter circuit configured to generate a voltage on a regulated supply voltage node;
      a sensor configured to generate telemetry data based on one or more measured operating parameters of the power converter circuit; and
      an interface circuit configured to forward the telemetry data to the branch power circuit; and
   wherein the branch power circuit is configured to forward the telemetry data to a memory circuit;
   wherein the memory circuit is configured to store the telemetry data in a storage location within a particular range of addresses reserved for the leaf power circuit.

2. The apparatus of claim 1, further comprising a host circuit coupled to the branch power circuit, wherein the host circuit is configured to convey a telemetry request to the branch power circuit, and wherein the branch power circuit is configured to forward the telemetry data to the host circuit in response to receiving the telemetry request.

3. The apparatus of claim 2, wherein the host circuit is further configured to:
   perform an analysis on the telemetry data; and
   send, to the branch power circuit, a command to adjust operation of the leaf power circuit based on the analysis.

4. The apparatus of claim 3, wherein the branch power circuit is configured to relay the command to the leaf power circuit, wherein the leaf power circuit includes a control circuit configured to adjust operation of one or more parameters of the leaf power circuit in response to receiving the command.

5. The apparatus of claim 2, wherein the branch power circuit is configured to convey the telemetry request to the leaf power circuit, and wherein the leaf power circuit is further configured to:
   generate the telemetry data in response to the telemetry request; and
   send the telemetry data to the branch power circuit subsequent to generating the telemetry data.

6. The apparatus of claim 2, wherein the leaf power circuit is configured to generate instances of the telemetry data at periodic intervals, and further configured to send the instances of the telemetry data to the branch power circuit at the periodic intervals.

7. The apparatus of claim 1, wherein the telemetry data includes a value of the voltage on the regulated supply voltage node.

8. The apparatus of claim 1, wherein the telemetry data includes a value of a current sourced to a load circuit coupled to the leaf power circuit.

9. The apparatus of claim 1, wherein the branch power circuit is further coupled to at least one additional leaf power circuit.

10. The apparatus of claim 1, wherein the branch power circuit is further coupled to at least one additional branch power circuit, wherein the at least one additional branch power circuit is coupled to at least one additional leaf power circuit.

11. A method comprising:
   generating, in a power converter of a leaf power circuit, a voltage on a regulated supply voltage node, wherein the leaf power circuit is one of a plurality of power circuits in a hierarchically arranged power circuit group that further includes a branch power circuit;

generating, using a sensor of the leaf power circuit, telemetry data based on one or more measured operating parameters of the power converter; and forwarding the telemetry data, using an interface circuit of the leaf power circuit, to the branch power circuit;

forwarding the telemetry data from the branch power circuit to a memory circuit; and storing the telemetry data in a storage location circuit within a particular range of addresses within the memory circuit, wherein the particular range of addresses is reserved for the leaf power circuit.

12. The method of claim 11, further comprising the memory circuit reserving respective ranges of addresses for one or more power sources including one or more additional instances of the branch power circuit and one or more additional instances of the leaf power circuit.

13. The method of claim 11, further comprising:
conveying, from a host circuit, a telemetry request to the branch power circuit; and
forwarding the telemetry data, from the branch power circuit to the host circuit, in response to receiving the telemetry request.

14. The method of claim 13, further comprising:
performing, using the host circuit, an analysis of the telemetry data;
sending a command, from the host circuit to the branch power circuit, to adjust operation of the leaf power circuit based on the analysis;
forwarding the command from the branch power circuit to the leaf power circuit; and
adjusting operation of one or more parameters of the leaf power circuit in response to receiving the command from the branch power circuit.

15. The method of claim 13, further comprising the leaf power circuit generating the telemetry data in response to the telemetry request.

16. The method of claim 13, further comprising:
periodically generating and forwarding instances of the telemetry data from the leaf power circuit to the branch power circuit;
storing the instances of the telemetry data in a memory of the branch power circuit; and
sending the instances of the telemetry data to the host circuit responsive to receiving corresponding instances of the telemetry request.

17. The method of claim 11, wherein the telemetry data includes a value of the voltage on the regulated supply voltage node and a value of a current sourced to a load circuit coupled to the leaf power circuit.

18. A system comprising:
a host circuit configured to send, via a first communication bus, a first telemetry request;
a memory circuit coupled to the host circuit; and
a first power group having a plurality of power circuits, wherein the plurality of power circuits includes at least one branch power circuit and at least one leaf power circuit coupled to the at least one branch power circuit in a hierarchical arrangement, wherein the at least one branch power circuit is configured to forward the first telemetry request to the at least one leaf power circuit, and wherein the at least one leaf power circuit includes:
a power converter circuit configured to generate a voltage on a regulated supply voltage node;
a sensor configured to generate telemetry data based on one or more measured operating parameters of the power converter circuit; and
an interface circuit configured to, responsive to receiving the first telemetry request, forward the telemetry data to the branch power circuit;
wherein the branch power circuit is configured to:
store the telemetry data; and
forward the telemetry data to the memory circuit; and
wherein the memory circuit is configured to store the telemetry data in a storage location within a particular range of addresses corresponding to the at least one leaf power circuit.

19. The system of claim 18, wherein the host circuit is further configured to:
perform an analysis on the telemetry data;
send, to the at least one branch power circuit, a command to adjust operation of the at least one leaf power circuit based on the analysis; and
wherein the at least one branch power circuit is configured to forward the command to the at least one leaf power circuit, and wherein the at least one leaf power circuit is configured to adjust one or more operating parameters of the power converter circuit in response to receiving the command.

20. The system of claim 18, wherein the memory circuit is configured to reserve respective ranges of addresses of a plurality of power sources, the plurality of power sources including the at least one branch power circuit, the at least one leaf power circuit, one or more additional instances of the branch power circuit, and one or more additional instances of the at least one leaf power circuit.

* * * * *